United States Patent
Jackovitch

(10) Patent No.: US 8,353,279 B2
(45) Date of Patent: Jan. 15, 2013

(54) GRILL AND METHOD OF USE THEREOF

(76) Inventor: Tim Jackovitch, Ellijay, GA (US)

(\*) Notice: Subject to any disclaimer, the term of this patent is extended or adjusted under 35 U.S.C. 154(b) by 390 days.

(21) Appl. No.: 12/574,028

(22) Filed: Oct. 6, 2009

(65) Prior Publication Data

US 2010/0018516 A1 Jan. 28, 2010

(51) Int. Cl.
- *A47J 37/00* (2006.01)
- *F24C 15/12* (2006.01)
- *F24C 15/00* (2006.01)
- *F24C 15/10* (2006.01)
- *F24C 15/20* (2006.01)
- *F24C 15/08* (2006.01)
- *F23M 7/00* (2006.01)
- *F24F 7/00* (2006.01)

(52) U.S. Cl. ..... 126/25 R; 126/28; 126/37 A; 126/37 B; 126/211; 126/214 D; 126/299 F; 126/1 R; 126/41 R; 126/190; 126/198; 454/63; 454/275

(58) Field of Classification Search ............... 126/25 R, 126/28, 37 A, 37 B, 211, 214 D, 299 F, 1 R, 126/41 R, 190, 198, 285 R, 287, 299 R; 454/63, 454/275

See application file for complete search history.

(56) References Cited

U.S. PATENT DOCUMENTS

| | | | |
|---|---|---|---|
| 18,297 A | 9/1857 | Pierce | |
| 2,109,796 A * | 3/1938 | Hirschenfeld | 99/345 |
| 2,444,402 A * | 6/1948 | Klein | 126/287 |
| 2,666,946 A * | 1/1954 | Miller | 16/361 |
| 3,667,648 A | 6/1972 | Koziol | |
| 3,791,370 A | 2/1974 | Fauser | |
| 3,933,144 A | 1/1976 | Bandy | |
| 4,340,027 A | 7/1982 | Fuss | |
| 4,512,330 A * | 4/1985 | Larkins | 126/547 |
| 4,664,026 A * | 5/1987 | Milloy | 99/352 |
| 4,729,364 A * | 3/1988 | Dailey | 126/39 R |
| 4,788,906 A * | 12/1988 | Starks | 99/450 |
| 4,862,792 A * | 9/1989 | Lerma, Jr. | 99/401 |

(Continued)

FOREIGN PATENT DOCUMENTS

JP  2001-128857 A  5/2001

(Continued)

*Primary Examiner* — Kenneth Rinehart
*Assistant Examiner* — William Corboy
(74) *Attorney, Agent, or Firm* — Minh N. Nguyen; Next IP Law Group LLP

(57) ABSTRACT

A grill comprising a front, a rear, a grill base, a first grill door and a second grill door. The first grill door comprises an opening and is in hinged communication with the grill base. The second grill door is in communication with the first grill door via a hinge, which is disposed at a rear portion of the opening. When the second grill door is in a closed position, the second grill door seals the opening in the first grill door. A method of grilling comprising the steps of opening the first grill door, placing food on the grill base and closing the first grill door to cook food. The method further comprises the steps of opening the first and the second grill door during the cooking process, thereby creating a flue that urges smoke away from the front of the grill and towards the rear of the grill.

18 Claims, 5 Drawing Sheets

U.S. PATENT DOCUMENTS

| | | |
|---|---|---|
| 4,895,130 A | 1/1990 | Staschke |
| 5,299,553 A * | 4/1994 | Giebel et al. .................. 126/25 R |
| 5,404,795 A * | 4/1995 | Coble .............................. 99/339 |
| 6,467,859 B2 | 10/2002 | Branz et al. |
| 6,606,986 B2 * | 8/2003 | Holland et al. ............. 126/25 R |
| 6,626,089 B1 | 9/2003 | Hubert |
| 6,701,577 B1 * | 3/2004 | Yeh ................................. 16/376 |
| 6,820,538 B2 | 11/2004 | Roescher |
| 6,874,496 B2 * | 4/2005 | Waits et al. .................. 126/25 R |
| 6,935,326 B1 | 8/2005 | Willis |
| 2005/0081721 A1 * | 4/2005 | Craycraft et al. ............... 99/450 |
| 2010/0206291 A1 * | 8/2010 | Axinte et al. ............... 126/25 R |

FOREIGN PATENT DOCUMENTS

| | | |
|---|---|---|
| KR | 2003-0027139 A | 4/2003 |
| KR | 20-0367566 Y1 | 11/2004 |

* cited by examiner

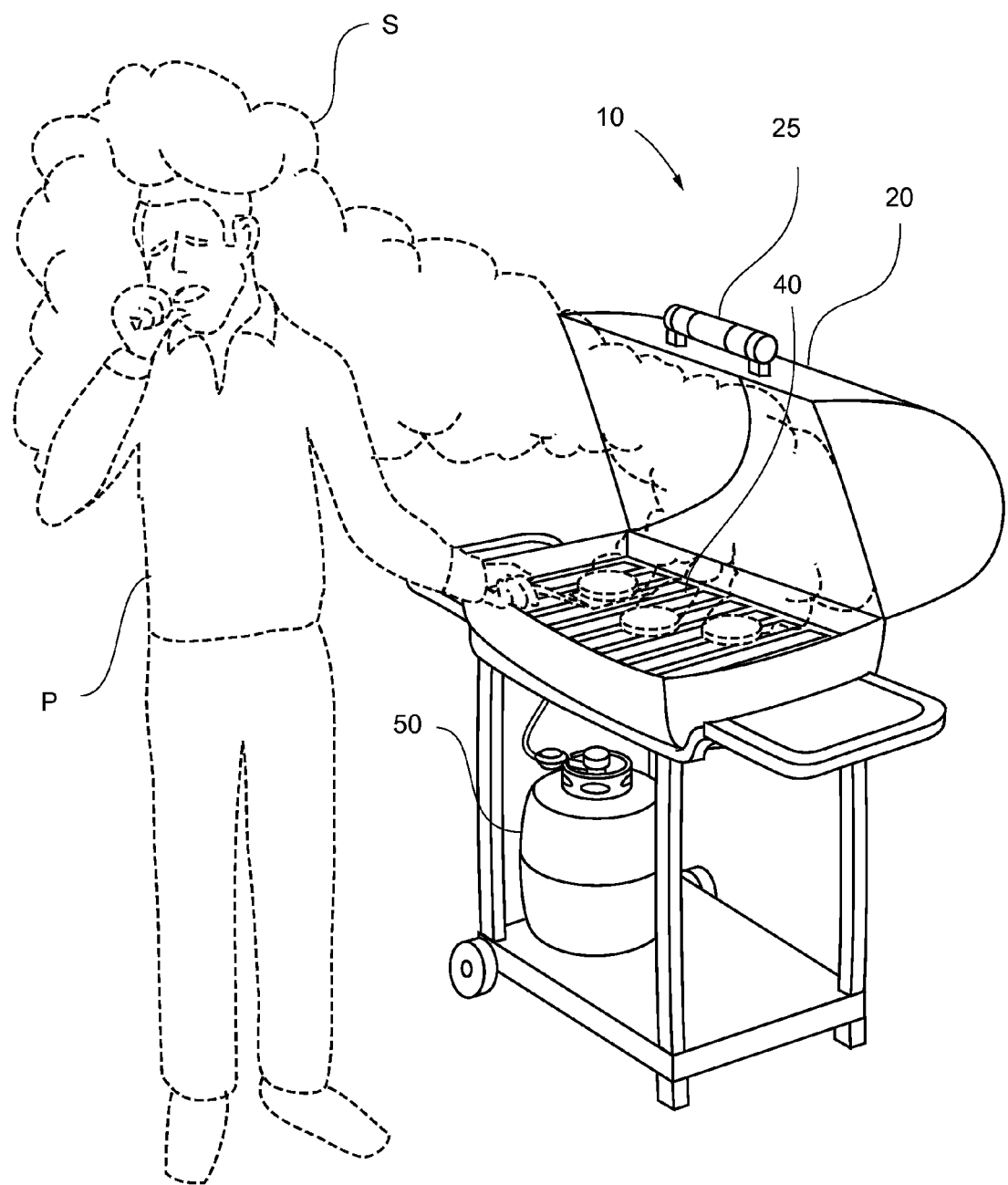
FIG. 1 - PRIOR ART

GRILL AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to a grill and method of use thereof, and more specifically to a grill having a secondary grill door that forms a hinged opening in the typical grill lid, wherein the secondary grill door when open forms a flue that directs smoke away from the front of the grill and toward the rear of the grill.

2. Description of Related Art

Barbeque pits are desirable for many occasions that require food to be cooked outdoors, such as family reunions, picnics, barbeques and company functions. Most available grills contain a door, which is opened to remove or add food to the grill, or to check on the cooking progress of the food. In order to open the door, however, the user has to stand relatively close to the front of the grill, and upon opening the door, the user is met with a blast of hot smoke. Such a situation is not only inconvenient, but also dangerous, as a user may inhale hot and intense smoke fumes.

Several previous devices have attempted to overcome the aforementioned problem with varying levels of success. One such device teaches a grill with a conventional grill cover that has an opening with a transparent vent window covering the opening. In use, the vent window selectively rotates about its front hinge, thereby causing the rear portion of the vent window to rise at a desirable angle away from the grill cover, and therefore exposing the opening. While such a device creates an opening through which smoke escapes, it lacks the ability to create a flue effect to direct smoke away from the user towards the rear of the grill when the grill cover is in an open position.

Another device teaches a typical grill lid having an opening and a glass panel. The glass panel is slidable along lined tracks. The glass panel may be slid inwardly to cover the opening or outwardly to expose the opening. While such a device covers the opening of a grill, the glass panel is not taught to be removable during the cooking process, and is only taught to be removable for cleaning purposes. Further, such a device lacks the ability to be positioned at different angles and lacks the ability to create a flue that moves smoke to the rear of the grill as the smoke exits.

Therefore, it is readily apparent that there is a need for a grill having a strong flue effect that will direct smoke generated during the cooking process away from the user in the immediate grill area when the conventional lid of a grill is open.

BRIEF SUMMARY OF THE INVENTION

Briefly described, in a preferred embodiment, the present invention overcomes the above-mentioned disadvantages and meets the recognized need for such an apparatus by providing a grill having a grill base, a first grill door and a second grill door. The first grill door is in hinged communication with the grill base and comprises an opening in the surface which is covered by the second grill door. The second grill door is in hinged communication with the first grill door, the hinge being disposed at a rear portion of the opening. When the first and second grill doors are in an open disposition, they form a flue that directs smoke away from the front of the grill and toward the rear of the grill.

According to its major aspects and broadly stated, the present invention in its preferred form is a grill comprising a front, a rear, a grill base, a first grill door and a second grill door. The first grill door is in hinged communication with the grill base and the first grill door has an opening therein. The second grill door is in communication with the first grill door via a hinge, which is disposed at a rear portion of the opening.

When the second grill door is in a closed position, the second grill door is disposed substantially below the hinge and seals the opening in the first grill door. When the first grill door is in an open disposition, the second grill door is opened with the first grill door to form a flue that directs smoke away from the front of the grill and toward the rear of the grill.

The opening in the fist grill door is disposed in a substantially front portion of the first grill door. Alternatively, the opening in the first grill door is substantially disposed in a top portion of the first grill door.

The grill may further comprise an arcuately-shaped plate disposed at a front portion of the opening on the first grill door. The arcuately-shaped plate is disposed substantially above a top surface of the first grill door and supports the second grill door.

The second grill door may further comprise side edges comprising vertical plates disposed on the side edges, wherein the vertical plates more directly guide smoke within the formed flue and away from the user. Additionally, the second grill door further comprises handles of heat resistant material. The second grill door may also be transparent.

Further, the first grill door pivots to a first selected angle. The first selected angle is preferably, for exemplary purposes only, sixty degrees from the grill base. The second grill door pivots to a second selected angle. The second selected angle is preferably, for exemplary purposes only, one-hundred and ten degrees from the grill base. A flue is created when the first grill door and the second grill door are opened. It will be recognized by those skilled in the art that the first grill door and the second grill door may pivot at other angles other than sixty and one-hundred and ten degrees, respectively, in order to directionally adjust the flue path. When open, the flue created directs smoke away from the front of the grill and toward the rear of the grill.

Additionally, the first grill door may comprise side edges having vertical plates extending therefrom. The first grill door further comprises a front edge having a front plate that is in communication with the vertical plates.

Further, in one embodiment the first grill door and the second grill door are operatively connected via a lever system, and the opening of the first grill door causes the second grill door to open to a selected angle.

Additionally, the grill may be utilized via a method of grilling comprising the steps of obtaining the grill having a front, a rear, a grill base, a first grill door and a second grill door. The first grill door is in hinged communication with the grill base and comprises an opening. The second grill door is in communication with the first grill door via a hinge disposed at a rear portion of the opening. The first grill door is opened and food is placed on the grill base. The first grill door is then closed. Subsequently, when the first grill door and the second grill door are opened, they create a flue which urges smoke away from the front of the grill and towards the rear of the grill.

More specifically, the preferred embodiment is a grill comprising a front, a rear, a grill base, a grate, a propane tank, a first grill door and a second grill door. The first grill door is secured to the grill base via a hinge and comprises a front portion and a back portion. The front portion of the first grill door has a front handle disposed thereon. The first grill door comprises an opening, and the opening comprises a rear portion. The second grill door is in communication with first grill door via a hinge, which is disposed at the rear portion of the opening. The second grill door also comprises side handles.

When the first grill door and the second grill door are closed, the second grill door is positioned below the hinge, therefore allowing it to efficiently seal the opening of the first grill door. When in use, a person opens the first grill door, via the front handle, and then opens the second grill door, via the side handles, hingedly pivoting the second grill door away from the front of the grill to the rear of the grill, the grill doors thereby creating a flue that directs smoke away from the user.

In an alternate embodiment, the grill comprises a first grill door and a second grill door. The first grill door comprises a front portion and a rear portion. The second grill door comprises sides having side handles. The front portion of the first grill door comprises a front handle, an opening and a director plate. The director plate is disposed above the front portion of the first grill door. The second grill door comprises side plates disposed on the sides. The side plates and director plate efficiently channel smoke away from the user while grilling.

In use, the first grill door is opened via the front handle and the second grill door is opened via the side handles. The second grill door hingably pivots away from the front portion of the first grill door toward the rear portion of the first grill door, thereby creating a flue that directs smoke away from the person who is standing in front of the grill.

In another alternate embodiment, the grill comprises a first grill door and a second grill door. The second grill door comprises side handles. The first grill door comprises a front portion and a rear portion, and the front portion comprises a front handle. The first grill door further comprises an opening, having a front panel and side panels disposed around the periphery thereof. In use, the first grill door is opened via the front handle. The second grill door is opened via the side handles, thereby exposing the opening. The front panel and the side panels extending along the periphery of the opening create a directional flue that channels smoke away from the person who is standing in front of the grill, while also allowing the person to observe the food cooking progress.

In yet another alternate embodiment, the grill comprises a first grill door, a second grill door, a grill base, a lever, a cable, a first securing bar and a second securing bar. The lever comprises a U-shaped end. The first grill door comprises a front portion, side portions and a rear portion. The front portion of the first grill door comprises a front handle and the second grill door comprises an inside portion. The first grill door is secured to the grill base via a hinge and the grill base comprises side portions. The lever is secured to the inside portion of the second grill door via a hinge. The lever is also secured to the side portion and the rear portion of the first grill door via, for exemplary purposes only, a screw through the first securing bar and the second securing bar. The U-shaped end of the lever is secured to the cable, which extends from the U-shaped end of the lever to the side portion of the grill base.

When the grill is closed, the first grill door and the second grill door are not open. In use, a person grasps the front handle to lift the first grill door, thereby exerting a pulling force on the cable to pull the U-shaped end of the lever towards the front portion of the first grill door. The lever thus pivots about the first and second securing bars, thereby opening the second grill door, wherein the distance of the lift of the first grill door directly correlates with the distance of the lift of the second grill door.

Accordingly, a feature and advantage of the present invention is its ability to direct smoke in a rearward direction away from the user.

Another feature and advantage of the present invention is its ability to prevent smoke from flowing into a user's face.

Still another feature and advantage of the present invention is its ability to position the second grill door at different angles.

Yet another feature and advantage of the present invention is its ability to control two grill doors by only lifting the main grill handle.

Yet still another feature and advantage of the present invention is its ability to provide a shield against smoke that is blown into a user's face by wind.

Still another feature and advantage of the present invention is its ability to directionally control smoke exiting from the grill.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which:

FIG. 1 is a perspective view of a grill commonly utilized in the prior art, shown in use;

Figure 2B:
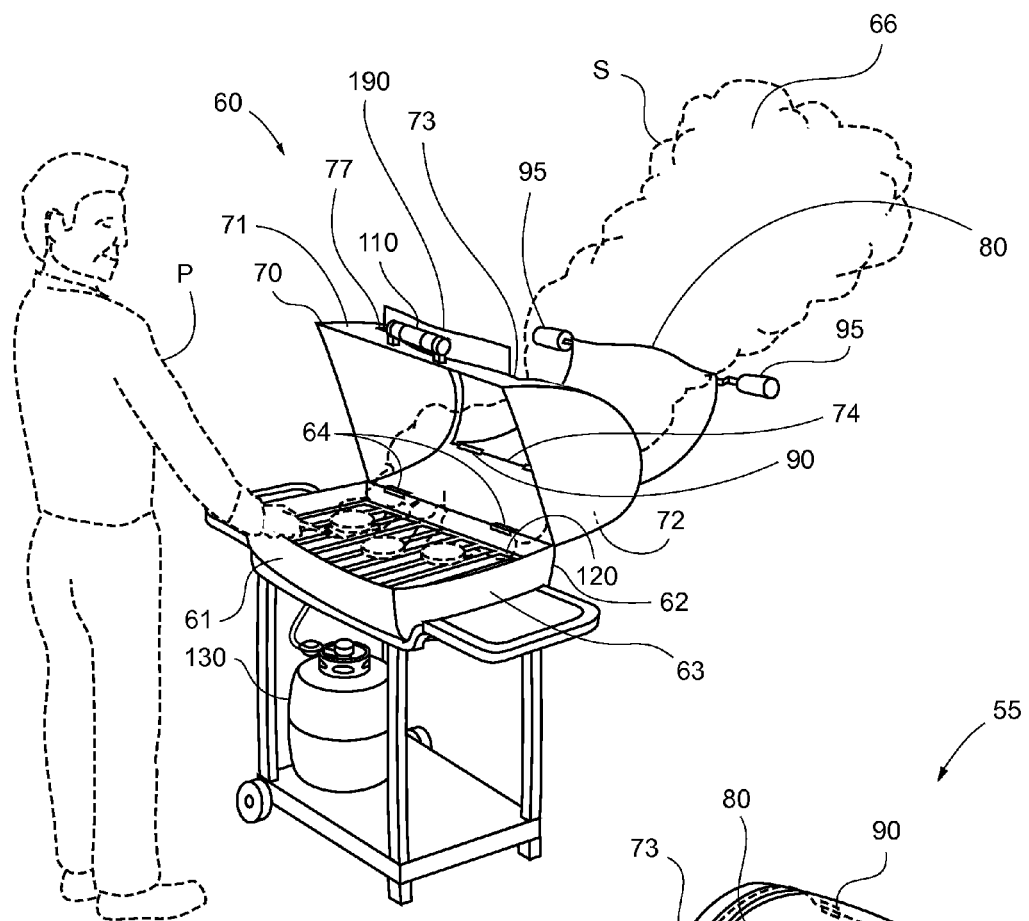
FIG. 2B is a perspective view of a grill with a primary grill door with a director plate and a secondary grill door according to the preferred embodiment, both shown in use in an open disposition, and directing smoke away from the front of the grill.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-5D, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIG. 1, depicted therein is prior art embodiment grill 10, wherein grill 10 comprises lid 20, grate 40 and propane tank 50. Lid 20 comprises front handle 25, wherein front handle 25 is utilized to selectively open and close lid 20. In use, person P opens lid 20 to access grate 40, wherein person P stands near grate 40 to cook food. Accordingly, person P is in direct contact with smoke S while cooking food on grate 40, thereby causing person P undesirable smoke inhalation and distress during the grilling process. This inhalation and distress is particularly acute if the wind is also blowing from the direction of the grill toward person P.

Figure 2A:
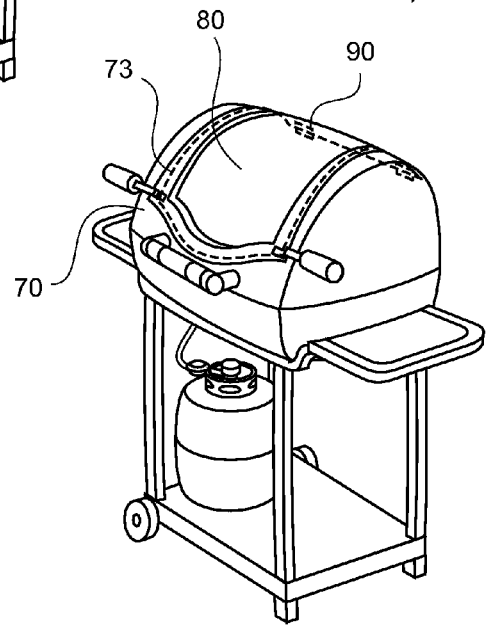
FIG. 2A is a perspective view of a grill having a primary and a secondary grill door according to the preferred embodiment, shown in a closed disposition.

Referring now to FIG. 2A, depicted therein is a preferred embodiment comprising grill 55, wherein grill 55 comprises first grill door 70, second grill door 80 and opening 73. When first grill door 70 and second grill door 80 are closed, second grill door 80 seals opening 73, wherein second grill door 80 is substantially disposed below hinges 90.

Referring now to FIG. 2B, depicted therein is another preferred embodiment comprising grill 60, wherein grill 60 comprises front 61, rear 62, grill base 63, grate 120, gas tank 130, first grill door 70, second grill door 80 and director plate 190. First grill door 70 is secured to grill base 63 via hinges 64, wherein first grill door 70 comprises front portion 71 and rear portion 72, and wherein front portion 71 comprises top surface 77, and wherein director plate 190 is disposed above front portion 71 extending upward from top surface 77 of first grill door 70. Front portion 71 of first grill door 70 further comprises front handle 110 disposed thereon and opening 73 in the surface thereof, wherein opening 73 comprises rear portion 74. Second grill door 80 is in communication with first grill door 70 via hinges 90, wherein hinges 90 are disposed at rear portion 74 of opening 73, and wherein second grill door 80 further comprises handles 95. When in use, person P selectively opens first grill door 70 via front handle 110 and second grill door 80 via handles 95, wherein second grill door 80 pivots on hinges 90 away from front 61 of grill 60 to rear 62 of grill 60, thereby creating flue 66 of directed smoke S, and wherein flue 66 directs smoke S away from person P, who is positioned in front of grill 60.

Figure 3:
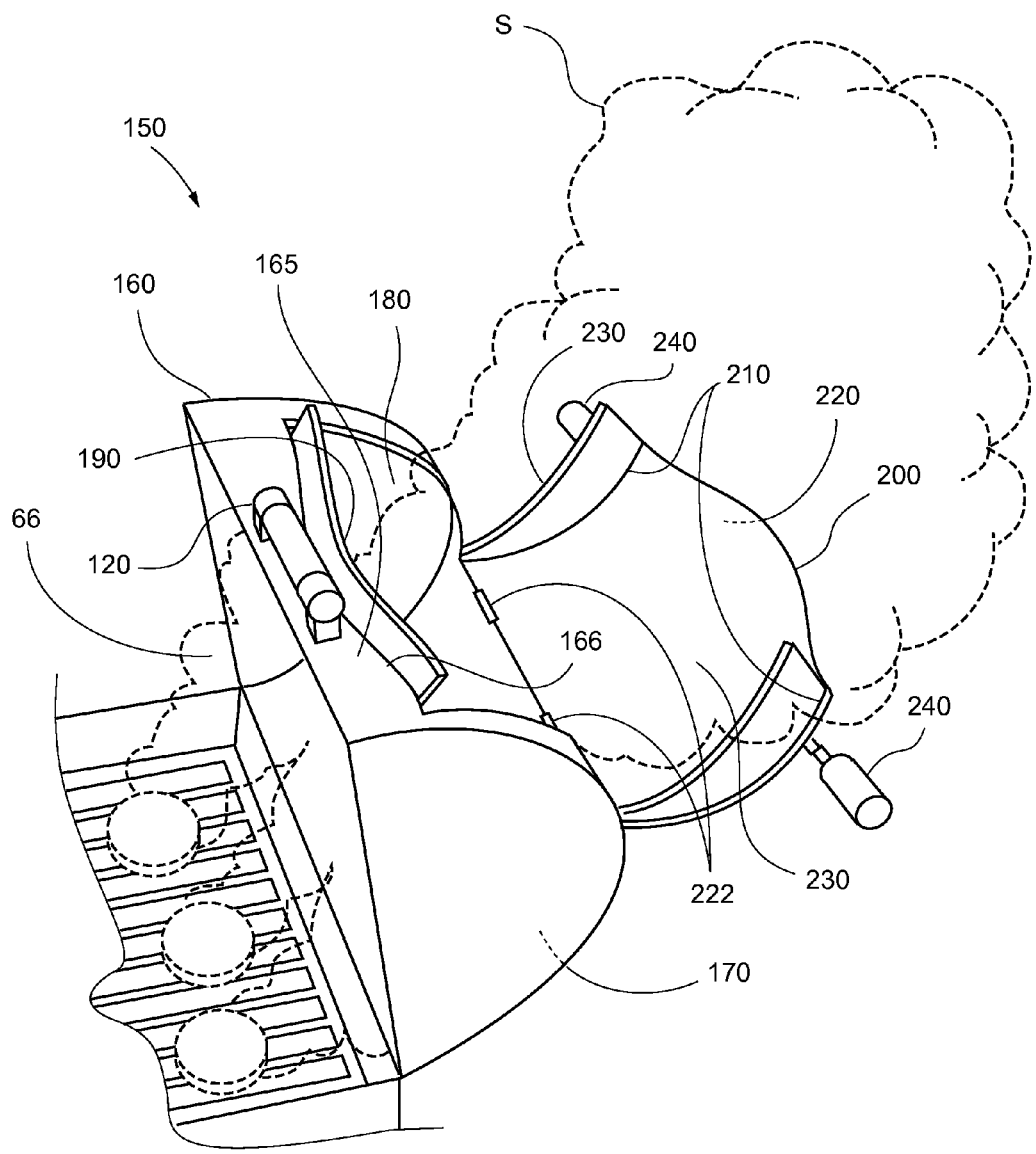
FIG. 3 is a perspective view of a grill with a secondary door in an open disposition, showing side plates and a director plate according to an alternate embodiment.

Referring now more specifically to FIG. 3, illustrated therein is an alternate embodiment of grill 60, wherein the alternate embodiment of FIG. 3 is substantially equivalent in form and function to that of the preferred embodiments detailed and illustrated in FIGS. 2A-2B except as hereinafter specifically referenced. Specifically, the embodiment of FIG. 3 comprises grill 150, wherein grill 150 comprises first grill door 160 and second grill door 200. Second grill door 200 comprises front portion 220, wherein front portion comprises handles 240. First grill door 160 comprises front portion 165 and rear portion 170, wherein front portion 165 comprises top surface 166, front handle 120, opening 180 and director plate 190, and wherein director plate 190 is disposed above front portion 165 and on top surface 166 of first grill door 160. Second grill door 200 further comprises side plates 230 disposed on sides 210, wherein side plates 230 extend inward therefrom to more efficiently move smoke S away from the user while grilling. When second grill door 200 is closed, side plates 230 are proximate first grill door 160 and director plate 190 contacts and supports second grill door 200, wherein director plate 190, side plates 230 and second grill door 200 effectively seal opening 180.

In use, first grill door 160 is opened via front handle 120 and second grill door 200 is opened via handles 240, wherein second grill door 200 pivots about one or more hinges 222 directionally from front 165 of first grill door 160 toward back 170 of first grill door 160, thereby directing smoke S away from person P who is standing in front of grill 150 (best shown in FIG. 2B). It will be recognized by those skilled in the art that director plate 190 could be utilized without side plates 230, wherein second grill door 200 closes flush with opening 180, covering same as in the preferred embodiment best shown in FIG. 2A.

Figure 4:
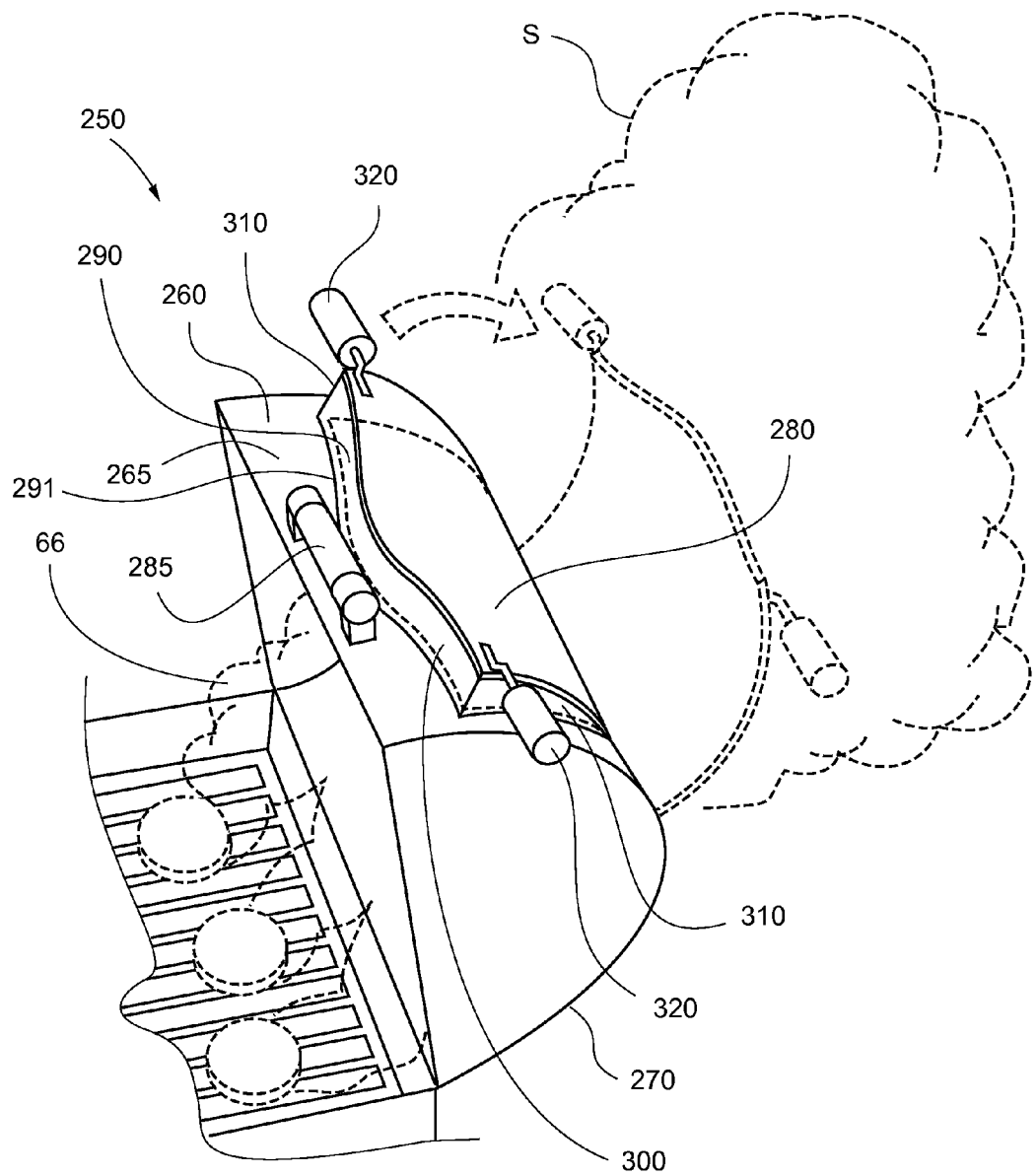
FIG. 4 is a perspective view of a grill having a secondary door that is in a closed disposition, the grill having side plates and a director plate according to an alternate embodiment.

Referring now to FIG. 4, illustrated therein is another alternate embodiment of grill 60, wherein the alternate embodiment of FIG. 4 is substantially equivalent in form and function to that of the preferred embodiments detailed and illustrated in FIGS. 2A-2B, except as hereinafter specifically referenced. Specifically, the embodiment of FIG. 4 comprises grill 250, wherein grill 250 comprises first grill door 260 and second grill door 280, and wherein second grill door 280 comprises handles 320. First grill door 260 comprises front portion 265 and rear portion 270, wherein front portion 265 comprises front handle 285 disposed thereon. First grill door 260 further comprises opening 290 in the surface thereof, wherein front panel 300 and side panels 310 extend along a portion of periphery 291 of opening 290, thereby guiding smoke efficiently away from the user when doors 260 and 280 are in an open disposition.

In use, first grill door 260 is opened via front handle 285. Second grill door 280 is selectively opened via handles 320, thereby exposing opening 290. Front panel 300 and side panels 310 extend along the periphery of opening 290, creating flue 66 (best shown in FIG. 2B) that directs smoke S away from person P who is standing in front of grill 250, while also allowing person P to observe the food cooking progress.

For the preferred and alternate embodiments illustrated in FIGS. 2A-4, first grill door 70, 160, 260 pivot to a selected angle of sixty degrees from grill base 63 and second grill door 80, 200, 280 pivot to a selected angle of one-hundred and ten degrees from grill base 63, for optimal performance, however, it will be recognized by those skilled in the art that pivoting at other selected angles will produce desired results as well.

Referring now more specifically to FIGS. 5A-5D, illustrated therein is an alternate embodiment of grill 55, wherein the alternate embodiment of FIGS. 5A-5D are substantially equivalent in form and function to that of the preferred embodiment detailed and illustrated in FIGS. 2A-2B except as hereinafter specifically referenced. Specifically, the embodiment of FIGS. 5A-5D comprises grill 330, wherein grill 330 comprises grill lid 340, grill door 350, grill base 400, lever 420, cable 430, securing rod 440 and securing bar 450, wherein lever 420 comprises U-shaped end 425. Grill lid 340 comprises front portion 360, first left side portion 370 and rear portion 380, wherein front portion 360 comprises front handle 365, and wherein grill lid 340 is secured to grill base 400 via hinges 410, and wherein grill base 400 comprises side portion 415. Grill door 350 is secured to grill lid 340 via hinges 421, wherein grill door 350 comprises inside portion 390, and wherein lever 420 is in rolling communication with inside portion 390 via roller 460. Lever 420 is secured to first side portion 370 and rear portion 380 of grill lid 340 via securing rod 440, securing bar 450 and fasteners 416, 417 and 451. U-shaped end 425 of lever 420 is secured to cable 430 via fastener 418, wherein cable 430 extends from U-shaped end 425 of lever 420 to side portion 415 of grill base 400, and wherein cable 430 is secured to side portion 415 via fastener 419.

Figures 5A, 5B, 5C, 5D:
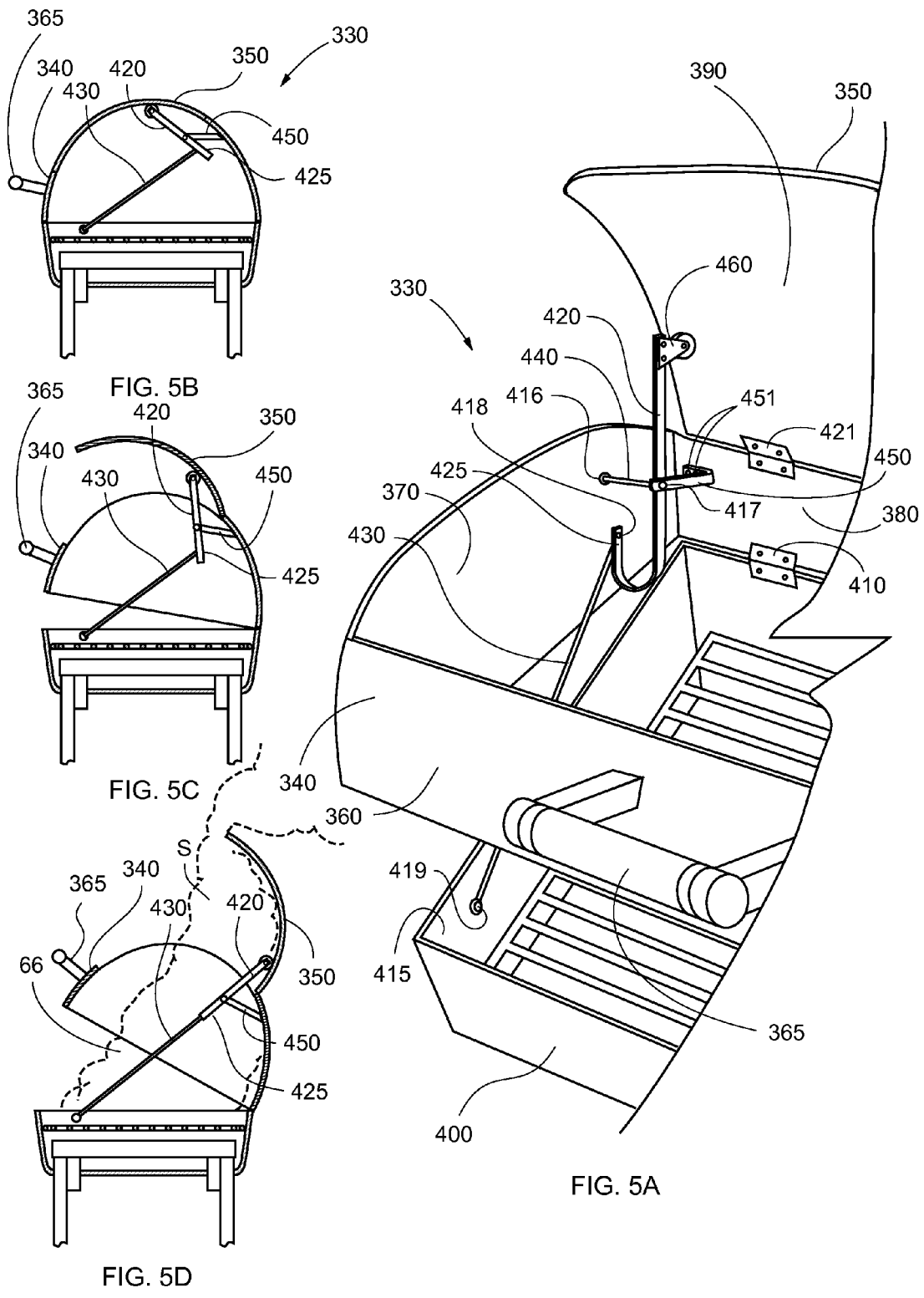
FIG. 5A is a cutaway perspective view of a grill having a secondary door, and a lever and cable opening system according to an alternate embodiment, shown in an open disposition.
FIG. 5B is a side view of the alternate embodiment of FIG. 5A, shown in a closed disposition.
FIG. 5C is a side view of the alternate embodiment of FIG. 5A with the secondary door partially opened.
FIG. 5D is a side view of the alternate embodiment of FIG. 5A with the secondary door in an open disposition.

Referring now to FIG. 5B, grill 330 is in a closed position, wherein grill lid 340 and grill door 350 are closed. In use, as best shown in FIGS. 5C-5D, person P (best shown in FIG. 1) grasps front handle 365 to lift grill lid 340, thereby exerting a pulling force on cable 430 to pull U-shaped end 425 of lever 420 towards front portion 360 of grill lid 340 (best shown in FIG. 5A). Lever 420 then pivots about securing rod 440 and securing bar 450, thereby causing roller 460 to roll in contact against inside portion 390 towards rear portion 380. Consequentially, as roller 460 moves towards rear portion 380, grill door 350 progressively lifts further from grill lid 340, wherein the distance of the lift of grill lid 340 by person P directly correlates to the distance of the lift of grill door 350 to create flue 66 (best shown in FIG. 5D). The opposite progression takes place during closure of grill lid 340.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A grill lid comprising:
   a lid that is in hinged communication with a grill base, wherein said lid comprises an opening in the surface thereof; and
   a grill door is in communication with said lid via a hinge, and wherein said hinge is disposed at a rear portion of said opening, and wherein said grill door covers said opening of said lid when said grill door is in a closed position; and
   a front panel that extends vertically above a top surface of said lid, extends horizontally across a width of said lid, and is disposed at a front portion of said opening, and wherein said front panel directs smoke away from a front portion of said lid responsive to said lid and said grill door being in an open disposition.

2. A grill comprising:
   a front;
   a rear;
   a grill base;
   a grill lid that is in hinged communication with said grill base, wherein said grill lid comprises an opening in the surface thereof; and
   a grill door is in communication with said grill lid via a hinge, and wherein said hinge is disposed at a rear portion of said opening, and wherein said grill door covers said opening of said grill lid when said grill door is in a closed position; and
   a front panel that extends vertically above a top surface of said grill lid, extends horizontally across a width of said grill, and is disposed at a front portion of said opening, and wherein said front panel directs smoke away from said front of said grill responsive to said grill lid and said grill door being in an open disposition.

3. The grill of claim 2, wherein said opening is substantially disposed in a front portion of said grill lid.

4. The grill of claim 2, wherein said opening is substantially disposed in a top portion of said grill lid.

5. The grill of claim 2, wherein said grill door is disposed substantially below said hinge connecting said grill door to said grill lid when said grill lid and said grill door are in a closed disposition.

6. The grill of claim 2, wherein said grill door comprises side edges, wherein vertical plates are disposed on said side edges of said grill door, and wherein said vertical plates guide smoke more directly away from the user.

7. The grill of claim 2, wherein said front panel is an arcuately-shaped plate.

8. The grill of claim 2, wherein said grill door further comprises handles, and wherein said handles comprise heat resistant material.

9. The grill of claim 2, wherein said grill door is transparent.

10. The grill of claim 2, wherein said grill lid pivots to a first selected angle.

11. The grill of claim 10, wherein said grill door pivots to a second selected angle.

12. The grill of claim 2, wherein said grill lid comprises side edges, and wherein said side edges comprise vertical plates.

13. The grill of claim 2, wherein a flue is created when said grill lid and said second grill door are opened to a selected angle, and wherein said flue directs smoke to said rear of said grill.

14. The grill of claim 2, wherein a flue is created when said grill lid and said second grill door are opened to a selected angle, and wherein said flue directs smoke away from said front of said grill.

15. The grill of claim 2, wherein said grill lid and said grill door are operatively connected via a lever system, and wherein opening said grill lid causes said second grill door to open to a selected angle.

16. A method of directing smoke in a grill comprising the steps of:
   obtaining a grill comprising a front, a rear, a grill base, a grill lid, a grill door, and a front panel, wherein said grill lid that is in hinged communication with said grill base, wherein said grill lid comprises an opening in the surface thereof, and wherein said grill door is in communication with said grill lid via a hinge, and wherein said hinge is disposed at a rear portion of said opening, and wherein said grill door covers said opening of said grill lid when said grill door is in a closed position, wherein said front panel extends vertically above a top surface of said grill lid, extends horizontally across a width of said grill, and is disposed at a front portion of said opening, wherein said front panel directs smoke away from said front of said grill responsive to said grill lid and said grill door being in an open disposition;
   opening said grill lid; and
   directing smoke away from said grill by said front panel in an open disposition of said grill lid and said grill door.

17. The method of claim 16, further comprising the step of: opening said grill door at a selected angle via side handles, thereby releasing smoke from said grill and allowing a user to observe the cooking food.

18. The method of claim 17, further comprising the steps of: opening said grill lid via a front handle; and opening said grill door via said side handles, thereby creating a flue, wherein said flue urges smoke away from said front of said grill.

* * * * *